United States Patent [19]

Inoue et al.

[11] Patent Number: 4,507,585
[45] Date of Patent: Mar. 26, 1985

[54] BEAM-INDEXING COLOR PICTURE TUBE ARRANGEMENT

[75] Inventors: Fumio Inoue; Hiroshi Jitsukata; Kunio Ando, all of Yokohama, Japan

[73] Assignee: Hitachi, Ltd., Tokyo, Japan

[21] Appl. No.: 418,672

[22] Filed: Sep. 16, 1982

[30] Foreign Application Priority Data

Sep. 18, 1981 [JP] Japan .............................. 56-146225
Jun. 4, 1982 [JP] Japan .............................. 57-94802

[51] Int. Cl.³ ..................... H01J 29/89; H01J 29/18
[52] U.S. Cl. .................................... 313/471; 313/474; 313/478
[58] Field of Search ................... 313/471, 474, 478

[56] References Cited

U.S. PATENT DOCUMENTS

| | | | |
|---|---|---|---|
| 2,932,756 | 4/1960 | Liebscher | 313/471 |
| 2,945,087 | 7/1960 | Graham et al. | 313/471 X |
| 3,005,125 | 10/1961 | Evans et al. | 313/471 X |
| 3,154,715 | 10/1964 | Jackson et al. | 313/471 X |
| 3,691,424 | 9/1972 | Goodman | 313/471 X |

Primary Examiner—Palmer Demeo
Attorney, Agent, or Firm—Antonelli, Terry & Wands

[57] ABSTRACT

A frontal light extraction type beam-indexing color picture tube arrangement comprises a phosphor screen which is formed on the inner surface of the tube panel and includes an array of color phosphor stripes each of which has an appropriate afterglow time and an array of index phosphor stripes each of which has a short afterglow time and emits a light index signal representative of the scanning position of an electron beam in the forward direction of the tube panel. A photoelectric converter for receiving the light index signal is provided in front of the tube panel.

12 Claims, 5 Drawing Figures

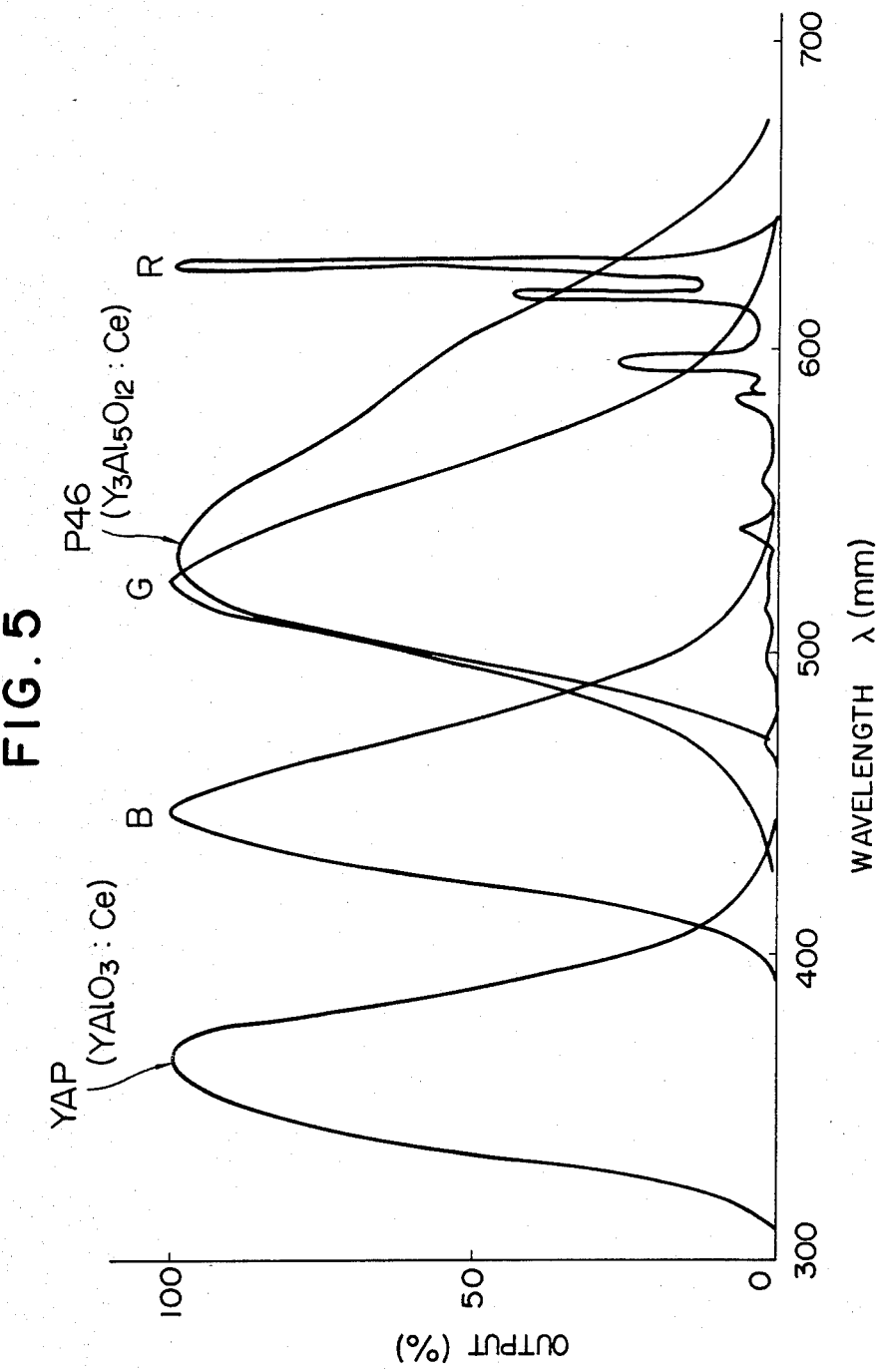

BEAM-INDEXING COLOR PICTURE TUBE ARRANGEMENT

The present invention relates to a small size of beam-indexing color tube arrangement suited to, for example, a view finder incorporated in a video camera.

All ordinary electronic view finders of video cameras utilizing picture tubes reproduce a black-and-white picture image. Especially, for a video camera for home use, the requirements of small size and compactness are made and hence a small cathode ray tube having a size of, for example, 1.5 inches is used and a reproduced picture image is observed in a form enlarged by a lens.

An electronic view finder can be changed to a color type by providing a chrominance signal processing circuit and using a color picture tube, in the same manner as a color television receiver. In a shadow mask type color picture tube, however, three electron guns are required and moreover a restriction is imposed on attempts to reduce the diameter of the neck portion of the picture tube since the resolution is decreased when the aperture of a focusing lens for the electron beams is made too small. Therefore, the shadow mask type color picture tube is unsuited to a picture tube as an electronic view finder which is required to be small-sized and compact.

On the other hand, a beam-indexing color picture tube has been known in which a color picture image can be reproduced by a single electron beam. In a small 1.5 inch picture tube, however, dimensions of a panel are little different from the diameter of a neck portion and the outer diameter of a deflecting yoke, that is, the spreading of a funnel portion is very small. Therefore, it is impossible to provide in the funnel portion a space where a window for transmitting a light index signal such as ultraviolet rays and a photoelectric converter for converting the light index signal into an electric signal can be appropriately arranged.

An object of the present invention is to provide a beam-indexing color picture tube arrangement suitable for use in applications in which the requirements of small size are strongly desired.

In order to attain the above object, according to the present invention, index phosphors are formed to generate light index signals in the forward direction of a phosphor screen like the direction of emission from color phosphors and a detector for detecting the light index signals is provided in front of the phosphor screen, thereby permitting the small size of beam-indexing picture tube.

The present invention will become more apparent from the following detailed description taken in conjunction with the accompanying drawings, in which:

FIG. 5 shows emission spectra of various phosphors.

Now, the present invention will be explained on the basis of embodiments thereof.

Figure 1:
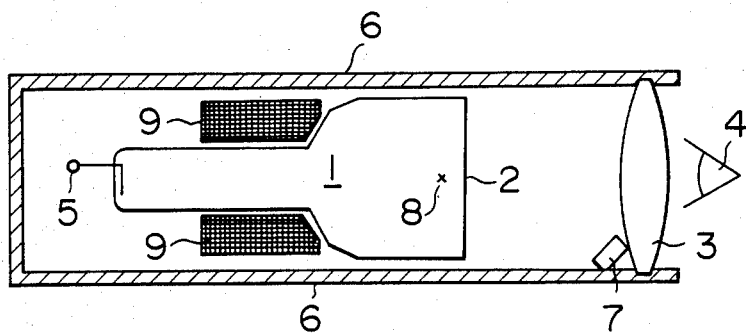
FIG. 1 is a schematic view of a beam-indexing color picture tube arrangement as an embodiment of the present invention.

In FIG. 1 showing a beam-indexing color picture tube arrangement according to an embodiment of the present invention, reference numeral 1 designates a beam-indexing picture tube, 2 a panel, 3 a lens, 4 observer's eyes, 5 a terminal for applying a video signal to the beam-indexing picture tube, 6 a casing for fixedly accommodating the beam-indexing picture tube 1, lens 3 and others, 7 a photoelectric converter, 8 the focus of the lens 3, and 9 a deflecting yoke.

A basic principle of a color picture image reproducing device using a beam-indexing picture tube is well known. That is, a phosphor screen provided on the inner surface of the panel of the picture tube includes a group of repeatedly arranged triplets each of which includes a set of red (R), green (G) and blue (B) phosphor stripes emitting red, green and blue lights upon impingement of an electron beam thereon and having their appropriate afterglow times, and a group of index phosphor stripes which are arranged in a specified positional relation with the triplet group and emit light index signals with short afterglow times upon impingement of an electron beam thereon. The scanning position of the electron beam is detected by the light index signal, and the intensity of the electron beam is successively controlled in accordance with the detected positional information to excite a desired color phosphor into desired brightness, thereby reproducing a color picture image with normal hue.

The photoelectric converter 7 is disposed at a position which is near the lens 3 but is away from the center of the lens 3 as far as possible, in order that the photoelectric converter 7 does not intercept a path of light from the reproduced picture image to the observer's eyes 4.

Figure 2:
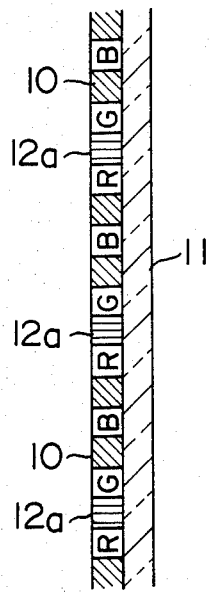
FIGS. 2 to 4 are structural views showing positional relations between color phosphors and index phosphors.
Figure 3:
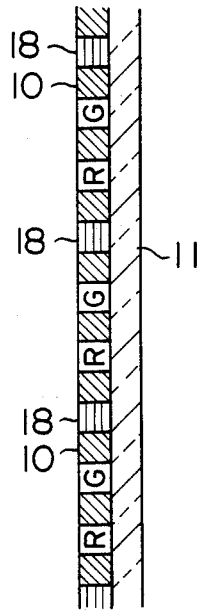

In the beam-indexing picture tube arrangement according to the present invention, the light index signal is detected in front of the phosphor screen provided on the panel 2 and therefore it is required to construct the fluorescent screen so that the amount of the light index signal emitted in the forward direction of the phosphor screen becomes as large as possible. FIGS. 2 and 3 are sectional views showing examples of a phosphor screen suitable for use in such a detection system. In the example shown in FIG. 2, a guard band between a red phosphor stripe and a green phosphor stripe is replaced by an index stripe 12a. In a conventional beam-indexing picture tube, a light index signal emitted from an index stripe cannot be obtained in front of a fluorescent screen because of the presence of a metal backing film and a guard band 10. In FIG. 2, a sufficiently intense light index signal can be obtained in front of the fluorescent screen by providing the index stripe 12a directly on the inner surface of the panel glass 11. Though a metal backing film is not shown in FIG. 2, it is provided in the same manner as in the conventional screen. The index stripe 12a is formed by applying to the panel an index phosphor material which has a short afterglow time of, for example, 100 ns or less, and emits light in an ultraviolet range. Since ultraviolet rays are not visible by the human eyes, i.e., invisible light, the replacement of a part of guard bands by the index stripes 12a does not result in a substantial deterioration of the quality of a reproduced picture image. In the example shown in FIG. 3, an index stripe 18 which is made by mixing an index phosphor with a blue phosphor and also serves as a blue phosphor stripe, is provided at the position of a blue phosphor stripe B on the phosphor screen of a conventional beam-indexing picture tube. In this case, too, a sufficient amount of light index signal can be obtained in front of the phosphor screen. In this example, in order to attain a minimum level of light index signal, even in an area where a reproduced image has no blue component, a weak, visible light of a blue color is generated. The visible light generated is less intensive and raises no problem since the human eyes are less sensitive to the blue light.

Though a phosphor material forming the color phosphor strip is required to have an appropriate afterglow time so that the flicker is not felt by the human eyes, a phosphor material used for forming the index stripe has usually a very short afterglow time (the time until the light intensity decreases to 1/e of the initial light intensity) such as 100 ns or less. When the afterglow time of the index phosphor is long, the afterglow of a certain index stripe impinged with an electron beam continues until an adjacent index stripe is impinged with the deflected electron beam. The afterglow after photoelectric conversion is observed as only a d.c. voltage and does not serve as an index signal for modulating the strength of the electron beam or controlling the switching of a chrominance signal. On the other hand, in the case of the phosphor screens shown in FIGS. 2 and 3, light from the color phosphors and light from the index phosphors are incident on the photoelectric converter 7, and an electric signal obtained after photoelectric conversion is the sum of an a.c. index signal and a d.c. component. In order to obtain only the a.c. index signal, the d.c. component has to be removed by a filter circuit.

Many of phosphor materials suitable for the index stripe having a short afterglow time emit light at shorter wavelengths which has a substantial part of its emission spectrum in an ultraviolet range.

As mentioned above, the light index signal is emitted toward the observer's eyes positioned in front of the fluorescent screen. In the case where the light index signal has a large emission peak in the ultraviolet range, there is a possibility of injuring the observer's eyes. Accordingly, when an index phosphor emitting such a light index signal is employed, it is desirable to take any measure for removing ultraviolet rays, for example, the coating of the surface of the lens 3 with an optical filter film for removing ultraviolet rays, the use of an ultraviolet ray absorbing material for the lens 3, or the provision of an ultraviolet ray cutting filter between the lens 3 and the observer's eyes 4.

Figure 4:
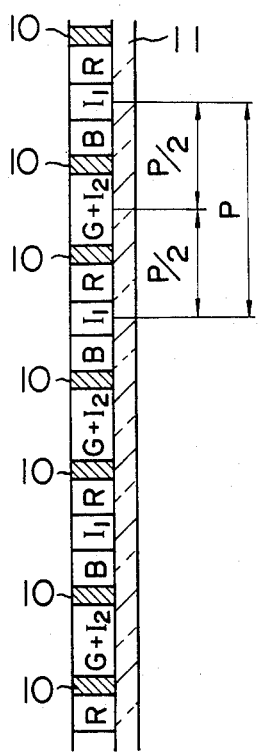

FIG. 4 shows a combined example of the structures shown in FIGS. 2 and 3. The example shown in FIG. 4 employs a 1/1 system in which a first index phosphor stripe and a second index phosphor stripe are arranged for one triplet. In FIG. 4, reference character P designates a triplet pitch, R, G, B red, green and blue phosphor stripes, and $I_1$ and $I_2$ first and second index phosphor stripes. In the present example, the first index phosphor stripe $I_1$ is disposed between the blue and red phosphor stripes B and R so as to form a single layer together with the adjacent stripes B and R, and a second index phosphor material is mixed with a green phosphor material to form a single layer which serves as both the green phosphor stripe G and the second index phosphor stripe (indicated by $G+I_2$). The width of the stripe $G+I_2$ is selected to be twice as large as that of each of the blue and red phosphor stripes B and R since otherwise there is a possibility that the mixing of the blue phosphor and the second index phosphor results in a decreased amount of emission from the green phosphor, thereby affecting the hue of a reproduced picture image.

FIG. 5 is a characteristic chart for showing emission spectra of various phosphors by way of example. In the case where the light index signal is drawn out from the front face of the beam-indexing tube (frontal light extraction type tube), as compared with the case where the light index signal is drawn out from the funnel portion of the tube, more attention must be paid in selecting index phosphor materials since the deterioration of hue of a reproduced picture image must be prevented notwithstanding the use of the index phosphor material having a short afterglow time. Cerium-activated yttrium orthoaluminate $YAlO_3:Ce$ (hereinafter referred to as YAP) can be preferably used as the first index phosphor material since light emitted from this phosphor is almost invisible to the human eyes. P46 ($Y_3Al_5O_{12}:Ce$ or $Y_3Al_3Ga_2O_{12}:Ce$) can be preferably used as the second index phosphor material since a picture image reproduced by a presently-used green phosphor is scarcely affected by light from this second index phosphor.

Conventionally, a filter for transmitting a fundamental frequency of the light index signal or a waveform shaping circuit was inserted in a light index signal receiving system. This arrangement allows the discrimination of the light index signal by the second index phosphor from the light emission by color phosphor which exhibits its emission spectrum similar to the second index phosphor. Such an arrangement can be employed in the present invention. Namely, the photoelectric converter 7 is provided with an optical filter which transmits lights from the YAP and P46 phosphors but intercepts other lights.

At present, a short-afterglow phosphor having its emission spectrum similar to a red phosphor is not available. In view of this fact and a fact that the center-to-center distance between the first and second index stripes being one-half the triplet pitch P, as shown in FIG. 4, is effective in eliminating the specified hue position in which no light index signal is generated in case of one index signal type, it is considered that the structure shown in FIG. 4 when the YAP and P46 phosphors are used as the first and second index phosphors, gives the best result at the present stage of time. When the width of the stripe $G+I_2$ made of the green and P46 phosphors mixed at a ratio of one to one was made equal to the width of each of the blue and red phosphor stripes B and R, the measured x and y values in chromaticity coordinates for a white image were 0.32 and 0.25 respectively. On the other hand, when the width of the stripe $G+I_2$ was made twice as large as that of each of the stripes B and R, as shown in FIG. 4 the measured x and y values in chromaticity coordinates for a white image were 0.30 and 0.31, respectively. That is, a white image nearly equal to a reference white of 9,300° K.+27MPCD (x=0.281 and y=0.311) was reproduced. If the width of the stripe $G+I_2$ is made large, the intensity of the index signal from the second index phosphor is increased so that the operation of a color synchronization circuit becomes more stable.

According to the foregoing embodiments, even for a 1/m system employing a relatively simple circuit arrangement, a frontal light extraction type beam-indexing color picture tube arrangement can be embodied which can stably operate for any hue, can provide a reproduced picture image of good color quality and is suited to the miniaturization.

We claim:
1. A beam-indexing color picture arrangement comprising:
an electron gun;
a screen glass;

a plurality of color phosphors provided on one surface of said screen glass facing said electron gun for respectively emitting predetermined color lights in the forward direction of said screen glass upon impingement of an electron beam thereon;

index phosphors provided on said one surface of said screen glass in a predetermined positional relation with said color phosphors in juxtaposition therewith for respectively generating light index signals in the forward direction of said screen glass upon impingement of electron beam thereon, said index phosphors including a first index phosphor which has a short afterglow time and exhibits its emission spectrum different from all said color phosphors and a second index phosphor which has a short afterglow time and exhibits its emission spectrum similar to a specified one of said color phosphors, said first index phosphor being provided between the color phosphors other than said specified color phosphor and said second index phosphor being provided in a form mixed with said specified color phosphor; and photoelectric conversion means provided in front of said screen glass with a spaced relation therefrom for receiving said light index signals to convert them into electric signals.

2. A beam-indexing color picture tube arrangement according to claim 1, wherein the width of the mixture of said second index phosphor and said specified color phosphor is selected to be larger than that of each of the color phosphors other than said specified color phosphor.

3. A beam-indexing color picture tube arrangement according to claim 2, wherein said first index phosphor includes cerium-activated yttrium orthoaluminate and is formed in a stripe shape between blue and red phosphor stripes and said second index phosphor includes a P46 phosphor material and is mixed with a green phosphor material.

4. A beam-indexing color reproducer comprising:

a cathode ray tube having an electron gun for producing an electron beam and a screen glass with an inner surface arranged in opposition to said electron gun, a plurality of color phosphors being provided on the inner surface of said screen glass for respectively emitting different color lights toward an outer surface of said screen glass in response to impingement of the electron beam thereon, and an index phosphor being provided on the inner surface of said screen glass for emitting an invisible light toward the outer surface of said screen glass in response to impingement of the electron beam thereon;

lens means disposed in spaced relation from the outer surface of said screen glass for enlarging an image produced on the outer surface of said screen glass; and conversion means disposed between the outer surface of said screen glass and said lens means proximate to an edge portion of said lens means for receiving emitted invisible light and converting the invisible light received thereby to an electric signal.

5. A beam-indexing color reproducer according to claim 4, wherein said index phosphor is provided between the adjacent color phosphors.

6. A beam-indexing color reproducer according to claim 4, wherein said index phosphor is provided in a form mixed with a specified one of said color phosphors.

7. A beam-indexing color reproducer according to claim 4, wherein said lens means includes means for substantially preventing the emitted invisible light from passing through said lens means.

8. A beam-indexing color reproducer according to claim 7, wherein said invisible light preventing means includes one of invisible light filter means and invisible light absorbing means, said lens means enabling the emitted different color lights to pass therethrough.

9. A beam-indexing color reproducer according to claim 4, wherein a plurality of index phosphors are provided on the inner surface of said screen glass in a predetermined positional relation with said color phosphors in juxtaposition therewith for respectively emitting the invisible light toward the outer surface of said screen glass upon impingement of the electron beam thereon.

10. A beam-indexing color reproducer according to claim 9, wherein said index phosphors includes a first index phosphor which has a short afterglow time and exhibits its emission spectrum different from all said color phosphors and a second index phosphor which has a short afterglow time and exhibits its emission spectrum similar to a specified one of said color phosphors, said first index phosphor being provided between the color phosphors other than said specified color phosphor and said second index phosphor being provided in a form mixed with said specified color phosphor.

11. A beam-indexing color picture tube arrangement according to claim 10, wherein the width of the mixture of said second index phosphor and said specified color phosphor is selected to be larger than that of each of the color phosphors other than said specific color phosphor.

12. A beam-indexing color picture tube arrangement according to claim 11, wherein said first index phosphor includes cerium-activated yttrium orthoaluminate and is formed in a stripe shape between blue and red phosphor stripes and said second index phosphor includes a P46 phosphor material and is mixed with a green phosphor material.

* * * * *